Jan. 18, 1949.  C. W. WOODS  2,459,353
LIQUID FILTER
Filed July 8, 1946  2 Sheets-Sheet 1

Inventor
C.W. WOODS.
By Arthur H. Sturges
Attorney

Inventor
C. W. WOODS.
By Arthur H. Sturges
Attorney

Patented Jan. 18, 1949

2,459,353

UNITED STATES PATENT OFFICE 2,459,353

LIQUID FILTER

Clayton W. Woods, Omaha, Nebr.

Application July 8, 1946, Serial No. 682,069

4 Claims. (Cl. 210—144)

The present invention relates to filtering systems for removing impurities from water and, more particularly, to tanks and valves employed in conjunction therewith.

It is an object of the invention to provide a filtering tank which is so constructed that the filtration material employed may be readily and rapidly back washed for cleansing said material at intermittent selected intervals of time in a manner whereby operating costs are lessened.

Another object of the invention is to provide a device for the above stated purpose which is compactly constructed for conserving floor space of an institution employing a water filtering system.

A further object of the invention is to provide a tank for the above stated purposes which is so constructed that an appreciably less quantity of steel material is required for the production thereof than heretofore required for tanks of equivalent filtration capacity.

A still further object of the invention is to provide a device which employs a minimum of valves for an operation thereof.

A particular object of the invention is to provide an economically manufactured arrangement of slidable valves for cooperative use with the particular tank of the present invention.

Other and further objects and advantages of the invention will be understood from the following detailed description thereof.

While the drawings illustrate a preferred embodiment of the invention, it will be understood that in adapting the means to meet specific needs and requirements the design may be varied and such other changes in minor details of construction and the number of parts employed may be resorted to within the scope of the invention as claimed without departing from the spirit thereof.

Filters of large capacity, such as are used in large laundries and similar institutions for clarifying liquids which utilize sand or other suitable granular filtering materials are usually so constructed that liquid such as water, which passes downwardly through said materials causes foreign substances and debris to be deposited clingingly with respect to said materials for separating debris from the water whereby a filtration tank must be periodically back washed and upwardly or in a direction reverse to the initial flow of water for cleansing the said filtering material of the said debris. For a back washing operation, as is well-known, a rate of flow of the washing liquid, primarily and usually water, which is three to five times as great as the rate of flow of liquid during a percolation of the latter is required in order to properly cleanse a bed of filtering material since a downward percolating flow is aided by gravity and passes through initially clean, sharp materials, as compared with a flow of water upwardly through an initially clogged bed of filtering material which initially impedes said upward flow resultant from deposits of sediment and foreign substances being initially united with the gravel, sand and other filtering material of a filter and the present invention aims to obviate certain undesirable features of the prior practice.

Figure 1:
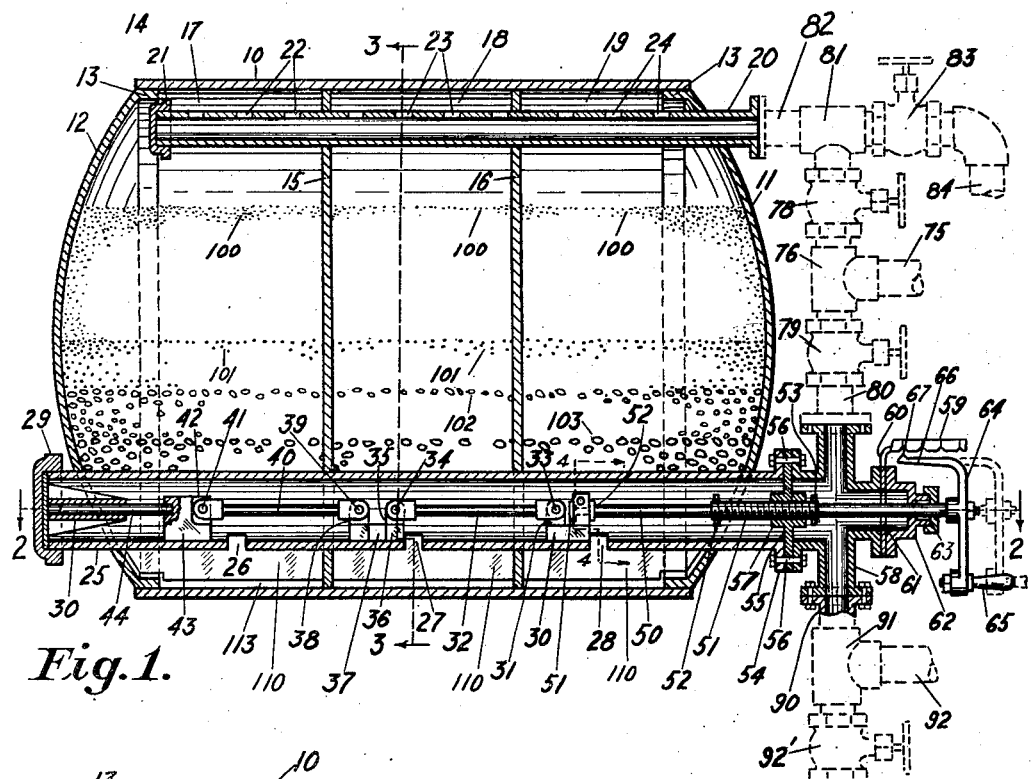
Figure 1 is a longitudinal vertical section of a filtering tank of liquid under pressure type and showing an embodiment of the present invention.

Referring now to the drawings for a more particular description and first to Figure 1, the cylindrical tank of the present invention includes a sleeve portion 10, having oppositely disposed ends or heads 11 and 12 which are provided with annular flanges 13. The flanges are welded to the sleeve 10 whereby the cylindrical tank, generally indicated at 14, is water-tight and enabled to withstand a comparatively high degree of water under pressure without leakage.

The interior of the tank 10 is sub-divided into a plurality of compartments by means of transversely disposed divisional walls 15 and 16, two thereof being depicted in the drawings whereby similar compartments are provided, said compartments being indicated at 17, 18 and 19, respectively.

The divisional walls 15 and 16 for the tank 14 are circular in plan and their perimetrical edges are welded to the inner annular surface of the sleeve 10 so that the said compartments are water-tight with respect to each other adjacent said walls.

In use, the tank 14 is preferably horizontally disposed and adjacent the uppermost portion thereof a pipe 20 is provided which extends through the head 11, the divisional walls 15 and 16 and through the compartments 17 to 19 inclusive, said pipe 20 having a cover cap or plug 21 on its inner end and being in communication with a source of supply of water under pressure, as later described.

The pipe 20 is provided with a plurality of apertures adjacent its upper portion, whereby the apertures 22 service the compartment 17, the apertures 23 the compartment 18 and the apertures 24 the compartment 19. The pipe 20 is welded to the divisional walls 15 and 16 and the head 17 whereby leakage of water adjacent said walls is prevented.

The compartments 17 and 18 are water-tight with respect to each other except that there is communication permitted through the pipe 20 from one compartment to the other and through the apertures 22 to 24 inclusive which provides a means of equalized hydrostatic pressure between the compartments and without interfering with the latter described back washing resultants.

Adjacent the bottom of the tank 14, a second pipe or collector conduit 25 is provided which extends through the heads 11 and 12 of the tank 14 together with the divisional walls 15 and 16 of said tank. The outer annular surface of the collector pipe 25 is welded to the adjacent portions of said heads and walls for providing a water-tight device.

The collector pipe 25 is provided with a plurality of transversely disposed apertures which are rectangular in plan and, as shown in Figure 1, the aperture 26 of the pipe 25 serves the compartment 17, the aperture 27 serves the compartment 18 and the aperture 28 serves the compartment 19.

That end of the collector pipe 25 which is adjacent the compartment 17 is provided with a cover cap 29, having a bearing sleeve 30 attached thereto and which extends inwardly of the collector pipe 25 for purposes later described.

Within the collector pipe 25, a shoe or valve head is provided for each of the apertures 26 to 28, inclusive.

Figure 4:
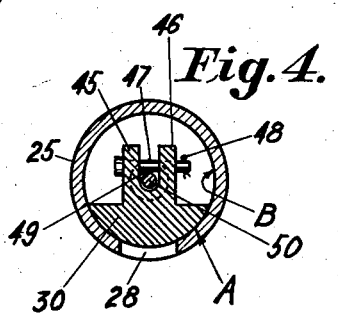
Figure 4 is a transverse section taken on line 4—4 of Figure 1.

Referring to Figure 4, the shoe 30 which, at times, covers or closes the aperture 28, is provided with an elongated arcuate surface A which is complemental to the cross-sectional contour of the inner annular surface B of the collector pipe 25, said shoe being approximately plano-convex in cross-section. The shoe 30 is provided with an upstanding lug 31 to which a bifurcated end of a link rod 32 is attached by means of a pin 33, as best shown in Figure 1.

The other end of the link 32 is provided with a similar bifurcated end which is attached, by means of a pin 34, to the lug 35 of the shoe 36. The shoe 36 is similar to the shoe 30 except that it is provided with a medially disposed aperture 37 which at times, during operation, becomes disposed in vertical alignment with the aperture 27 of the collector pipe 25 for permitting a passage of liquid through the aperture 27 of the collector pipe 25 and the aperture 37 of the shoe 36.

The aperture 37 of the shoe 36 is disposed medially of the ends of said shoe and said end portions of the shoe 36 seal or cover the aperture 27 of the pipe 25 at times, as later described.

The shoe 36 is provided with a further lug 38 which, by means of a further pin 39, is connected with a further link 40 at one of the bifurcated ends of the latter.

The shoe 43, at times, seals or covers the aperture 26 of the collector pipe 25 and, as thus described, it will be seen that at time when the shoe 30 is moved longitudinally of the collector pipe 25, that a similar movement is caused to be simultaneously applied to the links 32 and 40 and to the shoes 36 and 43 whereby said links and shoes slide longitudinally of the collector pipe 25 in unison.

The shoe 43 is preferably provided with a guide rod 44 attached to that end thereof which is adjacent to the cover cap of the collector pipe 25.

The guide rod 44 extends into the guide sleeve 30 carried by the cover cap 29 for the collector pipe 25, whereby, during use, the shoe 43 is prevented from sliding transversely of the collector pipe 25 unduly. However, it will be seen that since the shoes 30, 36 and 43 are compartively heavy, that during sliding movements thereof that they always seek the lowermost portion of the collector conduit 25 and it will be understood that since, as shown in Figure 4, the shoes overlap the side edges of their respective apertures appreciably, that at times when the said shoes do move slightly and transversely of the collector pipe 25 that the apertures of said collector pipe remain sealed or covered at desired times, as later described.

It will be understood that the interior of the collector pipe 25 is comparatively rough, since said collector pipe 25 is formed of common pipe whereby a small amount of leakage past the shoes is permitted without detrimentally effecting the later described resultants unduly.

As best shown in Figure 4, that end of the shoe 30 which is closest to the head 11 of the tank 14 is provided with vertically disposed spaced apart ears 45 and 46. A bolt 47 extends through the ears 45 and 46, being secured in operative position by means of a cotter pin or the like 48. By this means, an opening is provided between said ears and the lower surface of the shank of the bolt 47, said shank being indicated at 49.

A shaft 50 extends through the opening 49. The shaft is provided with a flared head 51 on its end and a bushing 52 is disposed annularly on the shaft adjacent the portion 51 thereof. The members 51 and 52 are spaced apart a distance complemental to the width of the ears 45 and 46 and, as thus described, it will be seen that the shaft 51 is attached to said ears and to the shoe 30 whereby the shaft 50 is rotatable with respect to the shoe 30 for moving the latter longitudinally of the collector pipe 25, as later described.

A medial portion of the shaft 50 is provided with a screw thread 51. A detent pin 52 is disposed through the shaft 50 at one end of the thread 51 and a similar detent pin 53 is secured to the shaft 50 at the other end of the screw thread 51.

The collector pipe 25 is provided with a flange 54 disposed exteriorly of the tank 14 and a web 55 is disposed across the pipe 25, being secured thereto by means of bolts or other suitable keepers 56. The web 55 permits water or the like to flow through the openings of said web and the latter is provided with a medially disposed bushing 57. The bushing 57 is provided with an axially disposed bore, the inner annular wall of which is provided with a screw thread, the latter being complemental with respect to the thread 51 of the shaft 50.

As thus described, it will be seen that since the web is stationary with respect to the conduit or collector pipe 25 that at times when the shaft 50 is rotated, a corresponding movement is applied to the above described links and shoes for causing them to slide longitudinally in and with respect to the collector pipe 25.

A cross or similar suitable pipe fitting 58 is secured to the web 55 and to the flanged end of the collector pipe 25 by means of the bolts or keepers 56.

An indicator plate 59 is provided with an arm 60, the latter having a medially disposed aperture 61 through which the shaft 50 extends, said apertured arm being secured to the cross 58 by any suitable means such as welding or the like.

A yoke 62 is similarly suitably secured to the arm 60 of the indicator plate 59 and the shaft 50 extends outwardly through the end of the yoke, the latter being provided with a packing gland and nut assembly 63 for preventing a leakage of water therethrough while at the same time permitting rotary movements of the shaft 50.

The outer end of the shaft 50 is provided with a crank 64 having an operating handle 65 suitably secured to one end thereof and an arm 66 at its other end. The arm 66 is disposed at an approximate right angle with respect to the crank 64 and adjacent the free end of the arm 66, an indicator is provided.

The indicator plate 59 is provided with four notches which serve as indicants and, in lieu of said notches, suitable indicia may be provided for purposes later described.

It will be seen that at times when the handle 65 is employed for manually rotating the shaft 50 that a sliding movement is applied to the shoes within the collector pipe 25 correspondingly.

By means of dotted lines, an inlet pipe is indicated at 75, said pipe being in communication with a source of supply of water under pressure. The pipe 75 is attached to a Tee 76 and a cut-off valve 78 is disposed at one side of the Tee 76 and a similar cut-off valve 79 at the other side thereof.

The cut-off valve 79 is in communication with an arm of the cross 58 through a pipe 80, as illustrated in Figure 1.

The cut-off cock 78 is in communication with a further Tee 81, the latter being in communication with a pipe 20 of the new device through a pipe 82.

The Tee 81 is in communication with a further cut-off cock 83, the latter being arranged to permit or to prevent, as may be selected, a passage of liquid from the cut-off cock 83 to a drain pipe 84, the latter attending to or being in communication with a sewer, not shown.

That arm of the cross 53 which is oppositely disposed with respect to the arm thereof to which the pipe 80 is attached is provided with a pipe 90. The latter is secured to a further Tee 91. The Tee 91 is in communication with the pipe 92 which leads to the service line whereby filtered water is distributed through said line, as later described.

The Tee 91 is provided with a cut-off cock 92', the latter being arranged to permit or to prevent, as may be selected, a passage of liquid from the cut-off cock 92' to a drain pipe 93, the latter being in communication with said sewer or connected to the drain pipe 84, as may be desired.

Within the compartments 17, 18 and 19 of the tank 14, an upper lamination of fine sand indicated at 100 is provided in the said compartments, said material 100 resting upon a lamination of coarser material indicated at 101, the latter being supported upon a lamination of fine gravel 102.

The laminations of gravel 102 within each of the compartments 17 to 19 inclusive are each supported upon a layer of coarse gravel 103, the latter extending to the bottom of the tank part way up the side wall thereof at each side of the collector pipe 29.

Figure 3:
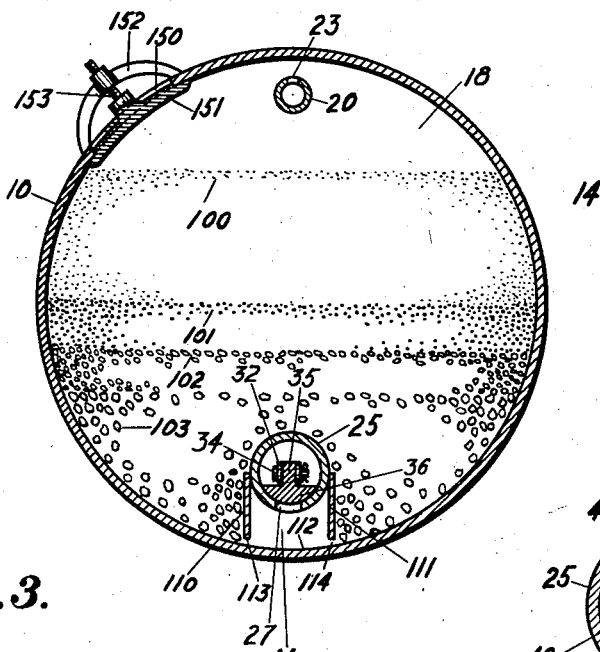
Figure 3 is a transverse section, the view being taken on line 3—3 of Figure 1.

Referring to Figure 3, the collector pipe 25 is provided with a skirt 110 at one side thereof and a like skirt 111 at the other side thereof.

The upper ends of the skirts are welded to the outer side wall of the collector pipe 25 and the lower edges of said skirts are spaced away from the inner annular wall 112 of the sleeve 10 of the tank 14, said spaces being indicated at 113 and 114, respectively.

Figure 2:
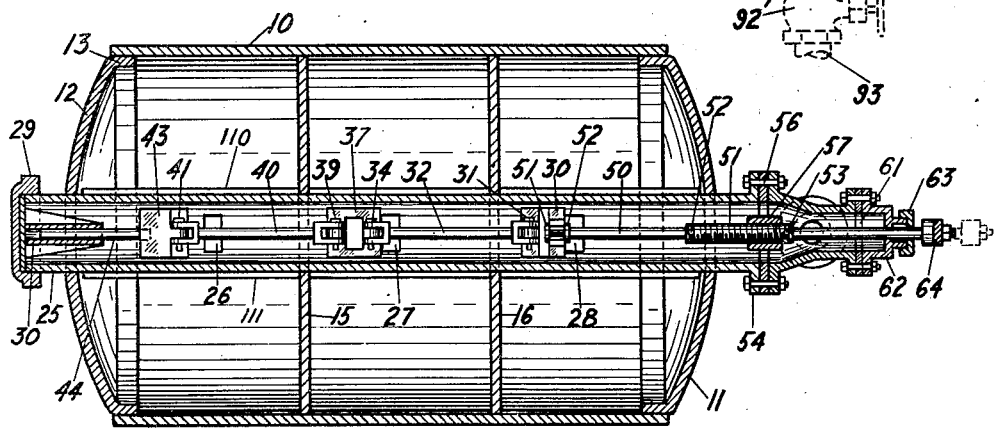
Figure 2 is a longitudinal section thereof, the view being taken substantially on line 2—2 of Figure 1 and looking in the direction of the arrows.

As best shown in Figure 2, the skirts 110 and 111 are provided in each of the compartments 17 to 19 inclusive and, in addition to being welded to the collector pipe 25, the ends of the skirts are preferably welded to the transversely disposed divisional walls 15 and 16 of the tank.

It will be understood that the spaces 113 and 114 are in vertical heighth less than the diameter of the coarse gravel 103 adjacent to said skirts whereby said gravel is prevented from entering the chambers X provided between the skirts 110 and 111 of each of the said compartments.

During operation, in order to filter water, the valves 83 and 92' are closed together with the valve 79 and at this time, the valve 78 is open, these valves being the conventional valves usually employed with a water filter mechanism. It will be understood that the pipe 75 is in communication with the source of supply of water under pressure to be filtered, said water flowing through the then open valve 78, Tee 81 and pipe 82 and into the tank 14 through the pipe 20 of the new device.

The water is distributed evenly from the pipe 20 through the apertures 22, 23 and 24 and respectively into the compartments 17 to 19 inclusive. Since the apertures of the pipe 20 are disposed upwardly with respect to the tank 14, the water under pressure upon leaving the pipe 20 impinges against the upper portion of the wall of the tank 14, said upper portion being arcuate in cross-section causing the water to become spread approximately evenly to both sides of the pipe 20, said water falling upon the sand 100, permeating the latter together with the other filtering material indicated at 101, 102 and 103. The water which reaches the bottom of the tank becomes freed of the undesired impurities and passes under the skirts of the new device through the spaces indicated at 113 and 114, as best shown in Figure 3.

At this time, the slide valve shoes 30, 36 and 43 are in the position shown in Figure 1 whereby the ports 26 to 28 inclusive are open for permitting the then filtered water to enter the collector conduit 25 and pass outwardly of the latter through the cross 58 and into the pipe 92, the latter being called the service pipe since it extends to laundry tubs, vats, tanks, containers or the like, where the filtered water is to be used and the said operation is permitted to continue until such time as it is desired to back wash the filtering material.

During percolation of the water which is delivered to the service pipe 92, the ports 26 to 28 inclusive being open, permits the entire capacity of the tank to be utilized since the multiple or plurality of compartments thereof are employed simultaneously.

During a back washing operation and in order to employ water under pressure for said purpose and derived from the same source as the percolated water, it will be understood that the degree pressure and flow rate being the same, it is essential to back wash the compartments 17 to 19 inclusive separately for freeing the debris from the filtering material and for this purpose the operation is as follows:

The conventional valves 78 and 92' are closed together with a valve, not shown, which governs a flow of liquid through the service pipe 92 and, at this time, the valve 79 is open together with the valve 83.

As thus described, it will be seen that during a back washing operation water under pressure from the inlet pipe 75 is caused to flow into the cross 58 and into the collector pipe 25 through the web 55 at the end of the pipe 25.

At this time the crank 64 is actuated for revolving the shaft 50 in a manner to move the shoes 43, 36 and 30 toward the crank, the latter being actuated until the indicator 67 is in alignment with the second notch formed on the indicator plate 59, said notch being the second notch spaced from the junction of the indicator plate 59 and the arm 60 thereof, whereby the shoe 30 then covers the opening or port 28 and one end of the shoe 36 covers the port 27, the port 26 being open since the adjacent end of the shoe 43 becomes moved toward the port 26 but does not cover the latter.

As thus described, it will be seen that the full force of the water under pressure from the intake pipe 75 becomes applied to the chamber or compartment 17 and through the port 26 from the pipe 25, said wash water under pressure passing under the edge of the skirts 110 and 111 of the compartment 17 and upwardly through the filtering material and into the pipe 20 through the apertures 22 of the latter, said water flowing outwardly of the pipe 20 through the valve 83 and into the pipe 84 for distribution to the sewer or other suitable place of disposal, the operation being permitted to continue until the filtering material of the compartment 17 is washed.

The operator now manipulates the crank 84 for disposing the indicator 67 in alignment with a third notch of the indicator plate 59 thereby causing the rod 50 to rotate for moving the shoes 43, 36 and 30 simultaneously further toward the crank 64 and, as thus described, it will be seen that said further movement causes the port 23 to become sealed or covered by the shoe 43, together with the port 28 covered by the other end of the shoe 30, said movement causing the aperture 37 of the shoe 36 to become in alignment with the port 27 of the pipe 25 whereby the force of the wash water under pressure thereby becomes diverted to the compartment 18 and to the exclusion of the compartments 17 and 19 with the exception of a small amount of water which may pass into the compartments 17 and 19 through the apertures 22 and 24 of the pipe 20, said amount being substantially negligible does not effect the desired resultant to an appreciable detrimental extent.

The wash water under pressure upon leaving the pipe 25 through the port 27 passes under the skirts adjacent said pipe as heretofore described and moves upwardly through the filtering material of the compartment 18 and outwardly of the pipe 20, valve 82 to the sewer, as above described, with respect to the compartment 17.

After the compartment 18 is washed, the operator further manipulates the crank 64 for causing the indicator 67 to become in alignment with the last notch of the indicator plate 59 whereby the shoe 30 becomes moved past and away from the port 28 of the pipe 29 and in the direction and towards the crank 64. It will be seen that at this time the portion of the shoe 36 which is disposed towards the shoe 43 then covers the port 27 and similarly that end of the shoe 43 which is disposed towards the cover cap 29 then covers the port 26 whereby the full force of the wash water under pressure from the inlet 75 becomes applied to the compartment 19 through the port 28, said water passing under the skirts of the compartment 19, as above described, for cleansing the filtering material of the compartment 19.

After all the compartments have been cleansed, the operator then manipulates the crank 64 for returning the shoes 30, 36 and 43 to their normal position, as shown in Figure 1.

Among other advantages of the invention, it is believed pertinent to mention that, as heretofore practiced, the complement of conventional valves shown in Figure 1 have employed for each filtering tank and, as above described, it will be seen that but one set of the said conventional valves are necessary for the multiple compartment tank of the present invention and that the necessity for a large number of conventional ground and machined valves is obviated by the present arrangement of parts which employs but one conventional valve for the multiple compartment tank thereof and a cheaply constructed shoe valve for each compartment. It is contemplated that, if desired, a small amount of water can leak past the shoe valves since the latter do not snugly seal their respective ports 26 to 28 and without appreciably effecting the desired resultants detrimentally.

It will also be obvious that, if desired, the shoe valves of the present invention together with the interior of the collector pipe 25 may be machined to fit snugly although it is found that water under pressure during a back washing operation aids in sealing the shoes of the present invention snugly against and over the walls of their respective ports 26, 27 and 28.

Figure 5:
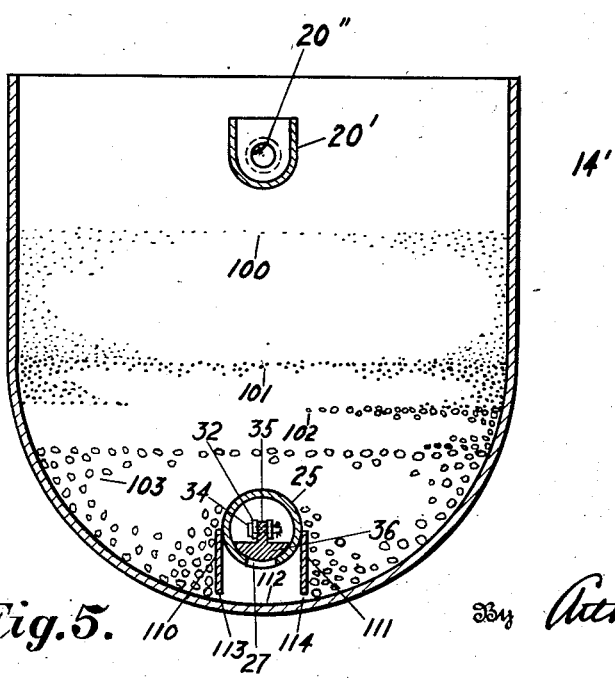
Figure 5 is a view similar to Figure 3 and showing a gravity type tank modification of the tank of the present invention.

With respect to the modification shown in Figure 5, the tank 14' thereof is approximately semi-circular in cross section, being provided with a plurality of compartments as heretofore described with respect to the tank 14. A further difference is that whereas a pipe 20 is employed in conjunction with the tank 14, a trough 20' is employed with respect to the gravity flow tank of the present invention shown in Figure 5. Water is introduced into the trough 20' from a source of supply and through the pipe 20''.

During operation, the water to be percolated overflows the upper edge of the trough 20' and permeates by gravity through the laminations of filtering material and during a back washing operation of the said material, the back washing water together with the sediment freed from the filtering material overflowing the top edge of the tank 14'. With these exceptions and differences in construction and operation, the two tanks are similar.

Referring to Figure 3, the compartment 18 of the tank 14 is provided with a manhole 150, having a cover 151 which is greater in area than said manhole. A crescent shaped support 152 is provided having ends which bear against the outer surface of the sleeve 10 of the tank 14 for supporting the manhole cover 151 in position by means of a threaded shaft 153 which is threadedly attached to the member 152 and to the manhole cover 151, as best shown in Figure 3.

At times when it is desired to change the filtering material within the tank or to decrease or add to the quantity thereof, the manhole cover 151 is removed for the said purpose whereby an operator may enter the tank 14 for shoveling said material outwardly through the manhole and it will be understood that the other compartments 17 and 19 of the tank 14 are similarly provided with manholes and covers therefor as represented by dotted lines in Figure 1.

From the foregoing description, it is thought to be obvious that a compartmented filter constructed in accordance with my invention is particularly well adapted for use by reason of the convenience and facility with which it may be assembled and operated, and it will also be obvious that my invention is susceptible of some change and modification including variations in the shape and size of the parts without departing from the principles and spirit thereof, and for this reason, I do not wish to be understood as limiting myself to the precise arrangement and formation of the several parts herein shown in carrying out my invention in practice, except as claimed.

I claim:

1. In a filter having three chambers each provided with an outlet: means for governing a flow of backwash water through said chambers and outlets, said means comprising a conduit-pipe having closed ends adapted to be connected to a source of supply of water under pressure, said pipe being provided with an opening for and in communication with each chamber; a shoe for each opening, said shoes each being of a larger size and of a complemental transverse shape with respect to the walls of their respective openings for sealing the latter at desired times, said shoes being longitudinally slideably disposed in said pipe; means connecting said shoes together, the middle shoe being provided with an aperture therethrough adapted to align with the walls of its opening at times; and means slideable with respect to said pipe and secured to one of said shoes and extending outwardly of said pipe for causing said shoes to slide longitudinally of said pipe.

2. In a filter having three chambers each provided with an outlet, means for governing a flow of backwash water through said chambers and outlets, said means comprising a conduit-pipe having closed ends adapted to be connected to a source of supply of water under pressure, said pipe being provided with an opening for and in communication with each chamber, a shoe for each opening, said shoes being of an approximately plano-convex shape in cross section complemental to the cross sectional contour of said pipe and each of a greater length and width than their respective opening, links connecting said shoes together in alignment, said shoes being slidably disposed in said pipe, the middle shoe being provided a medial aperture adapted to align with its opening at times, and a shaft having an end loosely connected to an end shoe the other end of said shaft being disposed outwardly of one end of said pipe and provided with a crank, said shaft being provided with a screw thread for sliding said shoes with respect to said pipe correspondingly with respect to movements of said crank.

3. In a filter having a plurality of chambers each provided with an outlet: means for governing a flow of backwash water through said chambers and outlets, said means comprising a conduit-pipe having closed ends adapted to be connected to a source of supply of water under pressure, said pipe being provided with an opening for and in communication with each chamber; a shoe for each opening, said shoes each being of a larger size and of a complemental transverse shape with respect to the walls of their respective openings for sealing the latter at desired times, said shoes being longitudinally slideably disposed in said pipe; means connecting said shoes together, at least one of said shoes being provided with an aperture therethrough adapted to align with the walls of its opening at times; and means slideable with respect to said pipe and secured to one of said shoes and extending outwardly of said pipe for causing said shoes to slide longitudinally of said pipe.

4. In a filter having a plurality of chambers each provided with an outlet: means for governing a flow of backwash water through said chambers and outlets, said means comprising a conduit-pipe having closed ends adapted to be connected to a source of supply of water under pressure, said pipe being provided with an opening for and in communication with each chamber; a shoe for each opening, said shoes each being of a larger size and of a complemental transverse shape with respect to the walls of their respective openings for sealing the latter at desired times, said shoes being longitudinally slideably disposed in said pipe; means connecting said shoes together, at least one of said shoes being provided with an aperture therethrough adapted to align with the walls of its opening at times; a shaft slideably and rotatably disposed in said pipe, said shaft being rotatably secured to one of said shoes; means for threadedly securing said shaft to said conduit; and means for rotating said shaft.

CLAYTON W. WOODS.

REFERENCES CITED

The following references are of record in the file of this patent:

UNITED STATES PATENTS

| Number | Name | Date |
|---|---|---|
| 514,531 | Williamson | Feb. 13, 1894 |
| 611,488 | Katzenstein | Sept. 27, 1898 |
| 1,544,617 | Wagner | July 7, 1925 |
| 1,794,841 | Elfueth | Mar. 3, 1931 |

FOREIGN PATENTS

| Number | Country | Date |
|---|---|---|
| 494,854 | Great Britain | Nov. 2, 1938 |